United States Patent [19]

Nagao

[11] Patent Number: 4,482,202

[45] Date of Patent: * Nov. 13, 1984

[54] OPTICAL GLASS FIBER TRANSMISSION LINES COUPLED JUNCTION CIRCULATORS

[76] Inventor: Tsukasa Nagao, 2-26-5-6, Hashirimizu, Yokosuka, Japan

[*] Notice: The portion of the term of this patent subsequent to Apr. 5, 2000 has been disclaimed.

[21] Appl. No.: 419,764

[22] Filed: Sep. 20, 1982

[51] Int. Cl.³ ............................................. G02B 5/172
[52] U.S. Cl. ................... 350/96.15; 350/375
[58] Field of Search ................... 333/1.1, 21 R, 21 A, 333/24.1, 24.3; 350/96.1, 96.15, 96.16, 96.29, 96.30, 355, 375, 376

[56] References Cited

U.S. PATENT DOCUMENTS

| | | | |
|---|---|---|---|
| 4,221,460 | 9/1980 | Hepner et al. | 350/96.13 |
| 4,239,329 | 12/1980 | Matsumoto | 350/96.15 |
| 4,272,159 | 6/1981 | Matsumoto | 350/375 |
| 4,274,710 | 6/1981 | Nagao | 350/375 |
| 4,294,509 | 10/1981 | Nagao | 350/96.15 |
| 4,378,951 | 4/1983 | Nagao | 350/96.15 |

*Primary Examiner*—William L. Sikes
*Assistant Examiner*—Frank González
*Attorney, Agent, or Firm*—Spensely, Horn, Jubas & Lubitz

[57] ABSTRACT

This invention discloses an optical circulator compatible with optical glass fiber transmission lines in optical communications in the wave length range of 1.0~1.7 microns. An optical circulator embodiment of the invention utilizes a magneto-optic circulator cylinder with the entry and reflective ends, at least three coupling glass-fiber transmission lines being connected to the entry end. The biasing magnetic field is applied in parallel with the common axis. This circulator embodiment of the invention possesses advantages in consisting of minimal constituents, and in being easy to make and simple to adjust.

2 Claims, 3 Drawing Figures

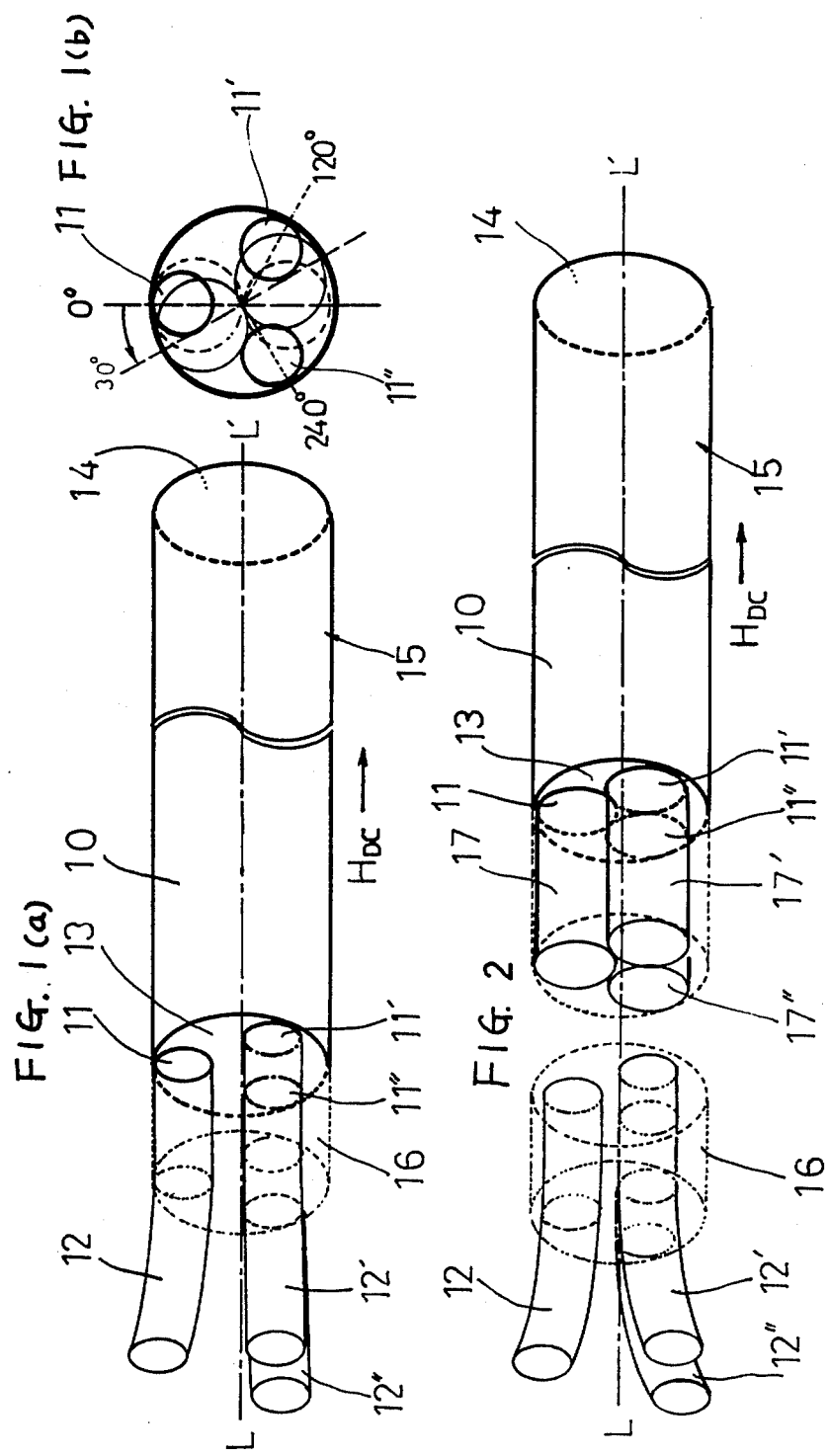

OPTICAL GLASS FIBER TRANSMISSION LINES COUPLED JUNCTION CIRCULATORS

BACKGROUND OF THE INVENTION

This invention relates to optical circulators compatible with optical glass fiber transmission lines (glass-fiber lines) in optical communication systems.

As it is well known, rapid advances have been made in the development of low-attenuation optical waveguides, such as glass-fiber lines, suitable for long-distance communications in the 1.0-1.7 microns wavelength range. In this range, transmission losses in a glass-fiber line have been reported to decrease to 0.3-1 dB/km. With the recent advent of semiconductor lasers and LED's operating in the region of these longer wavelengths, optical communications become more attractive. It is considered that optical communications suffice demands for high quality and large capacity, in addition to light weight and immunity from electrical induction disturbances. However, to realize such optical communication, various optical circuit elements, such as isolators, circulators, filters, couplers, power dividers, and other in addition to, amplifiers, modulators, and demodulators, have to be developed. Most of them certainly will appear in the near future. Especially, an optical circulator plays an indispensable role as a nonreciprocal element in two-way communication. In this communication, one single transmission line is used in common for transmitting two signals in opposite directions, so that signals from a sender are separated from signals for a receiver by use of a circulator. A circulator also acts as an isolator in measuring experiments. Up to date, there has been no optical circulator available with performance characteristics that compares favorably with those of optical glass-fiber lines.

The object of the invention is to provide an optical circulator which is comparable with optical glass-fiber lines, of small size and light weight, and easy to construct.

An optical circulator embodiment of the invention is constructed by combining a magneto-optic (MO) cylinder of a small diameter having a reflective coating at one plane end and three or more glass-fiber lines connected to the other plane end of an MO cylinder, each glass-fiber line being positioned in rotational symmetry to others. Thus, a coupled junction for three or more glass-fiber lines is constructed. Circulator action of this junction takes place under a biasing magnetic field applied parallel to the common axis of the MO cylinder. Detailed explanation of the circulator embodiment of the invention will be made after some physical background is mentioned.

In a circulator embodiment of the invention, an MO cylinder is utilized which is made of magneto-optic crystalline material, such as Al-YIG and Bi-YIG, having large magneto-optic anisotropy under biasing magnetic field. According to the magneto-optic theory, optical wave propagation in the MO material can be described in terms of dielectric tensor permittivity dependent upon the MO crystalline axis of symmetry and the direction of biasing magnetic field. In a sense, the MO anisotropic splitting factor $\eta/\epsilon$, where $\eta$ and $\epsilon$ are non-diagonal and diagonal elements of the tensor permittivity, results in giving rise to nonreciprocal action in the wave propagation in an MO structure, just as does the ferromagnetic anisotropic splitting factor $\kappa/\mu$, where $\kappa$ and $\mu$ are non-diagonal and diagonal elements of the tensor permeability of ferromagnetic material, in the operation of microwave circulators and isolators. Faraday rotation of linearly polarized waves in MO material or ferromagnetic material may be also explained in terms of $\eta/\epsilon$ or $\kappa/\mu$.

Actually measured experimentally, the value of $\eta/\epsilon$ is exceedingly small in comparison with that of $\kappa/\mu$. If one wants to rotate linearly polarized optical waves to a sufficient degree of polarization, it is necessary to let the waves pass through as long a distance as many hundreds of wavelengths, since the optical wave length of present interest is in the range of 1.0-1.7 microns. The above distance is still considered to be within several millimeters, but it can be shortened by half when an MO structure has one reflective end for waves to propagate a return path.

To meet the requirement of compatibility with glass-fiber lines, a circulator embodiment of the invention has to implement two mechanisms in the junction. One is to produce on an entry surface of the MO cylinder the desirable wave patterns of various orders so that incident and reflected waves can build up, just like standing wave patterns that azimuthal magnetic fields product in the common region of a microwave stripline Y circulator, and the other to make glass-fiber lines closely coupled with the MO cylinder through the above-mentioned various patterns. According to propagating circular cylindrical wave modes in the MO cylinder having a diameter of more than hundreds of wavelengths, as many propagating wave modes may be excited by incident waves from a coupled glass-fiber line. Appropriate diameter and length of the MO cylinder decreases the possible propagating wave mode numbers through highly precise setting-up of a circulator embodiment of the invention, since the MO cylinder constitutes a high Q resonator. Present day fabrication technology is capable of producing a sufficiently thin MO cylinder with high quality.

Machine-work setting-up and adjustment are generally interrelated. Glass-fiber lines are classed in single mode glass-fiber line (SMGF lines) and multiple mode glass-fiber lines (MMGF lines). If one utilizes SMGF lines or polarization-oriented single mode glass-fiber lines (POSMGF lines) which recently appeared in Japan, prior to MMGF lines, participating mode numbers can be decreased to get stable operation of a circulator, and thereby its broadband operation can be expected. Use of MMGF lines, however, has an advantage in being easy to construct a circulator mainly because this line has a large aperture of coupling.

Setting-up of a junction is none other than the way to make glass-fiber lines couple with the MO cylinder. One method disclosed in U.S. Pat. No. 4,378,951 was that each of that canted off coupled glass-fiber lines was attached to an MO cylinder at its peripheral positions symmetrically located in a common transverse section. That is different from the present way of coupling. The way of direct coupling of glass-fiber lines on the entry plane surface of the MO cylinder which is disclosed in a circulator embodiment of the invention gains an advantage in making use of volume modes among the propagating wave modes of the MO cylinder, thereby diminishing the useless part of the optical wave power propagating near the surface of the MO cylinder.

Adjustment is another matter of concern, dependent chiefly on biasing magnetic field after other factors are all determined. There are several losses of optical wave powers, conversion losses between wave modes of the MO cylinder and coupled glass-fiber lines, radiation losses from the cylindrical and plane surfaces, and dissipation losses in the MO cylinder. Conversion losses can be improved by selecting the aperture of the MO cylinder corresponding to the core of the glass-fiber line and, by covering the entry surface of the MO cylinder with reflective coating except openings for coupled glass-fiber lines. The radiation losses become negligible if the MO cylinder is made to get a high Q resonator, or if the MO cylinder is covered by a reflecting coating. The dissipation losses in the MO cylinder intrinsically depend on crystal growing process, so that crystalline material of high quality is always important.

SUMMARY OF THE INVENTION

The optical circulator embodiment of the invention utilizes volume modes among propagating wave modes existing inside the MO cylinder. Coupled glass-fiber lines are directly attached to openings on the entry surface of the MO cylinder with the other reflective end. The optical circular embodiment of the invention possesses advantages in comprising minimal constituent elements, and in being easy to construct and simple to adjust.

BRIEF DESCRIPTION OF THE DRAWINGS

FIG. 1 illustrates (a) a perspective view of an instance in application of a circulator embodiment of the invention and (b) its transverse view.

FIG. 2 is a view in perspective of another circulator embodiment of the invention.

DETAILED DESCRIPTION OF THE INVENTION

Referring to the drawings shown in FIG. 1, a basic structure of an optical circulator embodiment of the invention is explained. The optical circulator is set up from an MO cylinder 10 and three glass-fiber lines 12, 12' and 12" directly attached to the respective openings 11, 11' and 11" formed on the entry plane surface 13 of the MO cylinder. Each glass-fiber line, being cut at a right angle and polished, is positioned in rotational symmetry at 120° apart from others. The entry and terminal ends 13 and 14, and the cylindrical surface 15 are finely polished and usually covered by reflective coating except the entry end, more specifically, openings for coupling glass-fiber lines, thereby diminishing radiation losses. The coating on the cylindrical surface may be omitted when two plane ends are arranged with fairly good accuracy to lie in parallel to get a parallel-mirror-type resonator. The biasing magnetic field is applied parallel to the common axis L-L'.

Assume that incident optical waves via glass fiber line 12 penetrate into the MO cylinder 10 through the opening 11 to excite circular cylindrical waves of various order modes. They propagate in the axial direction, as clockwise and counterclockwise rotating, and repeatedly travel between two plane ends 13 and 14. These waves have a broad modal spectrum distribution for the case of an MMGF line and a narrow modal spectrum distribution for the case of an SMGF line. In either of these cases, the axial propagating waves inside the MO cylinder produce various wave patterns on the entry plane surface after repeated passages through the cylinder. A dipolar pattern of the lowest order mode with no bias magnetic field is shown in broken lines in FIG. 1(b). When the MO cylinder is magnetically biased, the dipolar pattern is rotated. If the dipolar pattern in the broken line is rotated by 30° as shown in solid lines, optical waves, incident upon the opening 11, appear in the opening 11', but do not appear in the opening 11". A large amount of incident wave powers emanates from the opening 11' into the glass-fiber line 12'. Adjusting the rotated angle to 30° is made by changing the biasing magnetic field $H_{DC}$. The above-noted circulating operation also takes place regarding other openings 11' and 11".

As early mentioned, there are various wave patterns, for instances, dipolar pattern, quadrupolar pattern, and so forth. They are useful to achieve circulator actions. They can simultaneously take place at different operating frequencies if they satisfy circulation requirements which are not mentioned here. Incident optical waves through a glass-fiber line are, however, considered to be of gaussian beams, so that they excite numerous propagating wave modes inside the MO cylinder. As the MO cylinder acts as a parallel-mirror-type resonator, resonance eliminates propagating modes. Actual transverse wave patterns seen on the entry surface are more complicatedly modified to involve numerous ingredients around the above-mentioned simple wave patterns. Nevertheless, circulator actions are totally achieved. Structural factors which effect circulator operation are diameter and length of the MO cylinder, the ratio of apertures of the MO cylinder and glass-fiber line, locations of openings and so on.

Highly efficient performance and stable operation of the inventive circulator embodiment is of course desired. To this end, choice of a thin MO cylinder, use of SMGF lines or polarization-oriented SMGF lines, and application of curved-mirror-type resonators, instead of a parallel-mirror-type one, are considered. The thinner the MO cylinder being used, the less modal numbers are expected. To get a thin MO cylinder needs exquisite machine-work. SMGF lines are preferable to MMGF lines, but the former line has some difficulty in coupling with a thin MO cylinder. POSMGF lines have the unique transmission characteristics in propagating linearly polarized optical waves exclusively. In application of the POSMGF lines to the above-disclosed circulator embodiment of the invention, three POSMGF lines are connected to the respective openings, each opening being located symmetrically at 120° apart from others, and additionally, three POSMGF lines being oriented in polarization to the respective location angles of the three openings as shown in FIG. 1(b). The use of the POSMGF line has an advantage of getting higher, efficient and more stable operation of the circulator embodiment of the invention.

Application of curved mirror systems to an MO cylinder is considered useful to decrease conversion losses. Curved mirror systems are widely known as a fabry-perot-type resonator. Combination of various curved mirrors, concave and convex mirrors are possible, but it may be difficult to put these ideas into practice.

Coupling of glass-fiber lines with an MO cylinder is another problem. One easy way of coupling is shown in FIG. 2. The basic idea is to utilize circular cylindrical lenses 17, 17' and 17" between the respective openings 11, 11' and 11", and coupled glass-fiber lines 12, 12' and 12". The cylindrical lenses guide broad irradiations from the glass-fiber lines to the respective openings on the entry end, or contrary, from the openings to the glass-fiber lines. 16 in FIGS. 1 and 2 indicates a molded plastic to fix coupled glass-fiber lines and a lens system.

According to the disclosure of the invention, an optical circulator compatible with optical glass-fiber transmission lines is provided. The circulator embodiment of the invention utilizes volume modes among propagating wave modes existing inside the magneto-optic cylinder, and therefore the wave theory can be applied in designing and constructing a circulator embodiment of the invention as in microwave circulator design. In the circulator embodiment of the invention, coupled optical glass-fiber transmission lines are directly attached to openings formed on the entry plane surface of the magneto-optic cylinder with the other reflective end, thereby possessing advantages in consisting of minimal constituents, and in being easy to make and simple to adjust.

What we claim is:

1. An optical glass-fiber transmission lines coupled junction circulator comprising a magneto-optic circular cylinder made of magneto-optic material having optical anisotropy under biasing magnetic field to effect magneto-optic Faraday rotation, said magneto-optic cylinder being arranged in the common axis, and said magneto-optic cylinder being optically shielded, plural numbers of coupling optical glass-fiber transmission lines, each line being attached to an opening formed on an entry plane surface on said magneto-optic cylinder in rotational symmetry around said common axis, and means for magnetically biasing said magneto-optic cylinder in the direction parallel to said common axis.

2. An optical glass-fiber transmission lines coupled junction circulator as defined in claim 1, wherein coupling lens is inserted between a coupling optical glass-fiber transmission line and an opening formed on an entry plane surface on said magneto-optic cylinder.

* * * * *